United States Patent [19]

Taylor et al.

[11] Patent Number: 4,792,478

[45] Date of Patent: Dec. 20, 1988

[54] INORGANIC OXIDE FIBRES AND THEIR PRODUCTION

[75] Inventors: Michael D. Taylor, Chester; Martyn H. Stacey, Northwich; Jeffrey S. Kenworthy, Guisborough Cleveland; Stuart S. Boffey, Crewe, all of United Kingdom

[73] Assignee: Imperial Chemical Industries PLC, London, England

[21] Appl. No.: 874,999

[22] Filed: Jun. 16, 1986

[30] Foreign Application Priority Data

Jun. 21, 1985 [GB] United Kingdom ............... 8515765

[51] Int. Cl.$^4$ .......................... B32B 9/00; D02G 3/00
[52] U.S. Cl. ................................ 428/221; 428/224; 428/225; 428/232; 428/292; 428/293; 428/294; 428/357; 428/379; 428/364; 428/299; 428/332
[58] Field of Search ............... 428/357, 224, 222, 299, 428/227, 379, 232, 221, 225, 292, 293, 294, 698, 699, 332; 501/95; 264/234, 204

[56] References Cited

U.S. PATENT DOCUMENTS

| | | | |
|---|---|---|---|
| 3,853,688 | 12/1974 | D'Ambrosio | 501/95 X |
| 3,950,478 | 4/1976 | Kenworthy et al. | 264/234 |
| 3,953,561 | 4/1976 | Shin | 501/95 X |
| 3,996,145 | 12/1976 | Hepburn | 501/95 X |
| 4,125,406 | 11/1978 | Sowman | 501/95 X |
| 4,166,147 | 8/1979 | Lange et al. | 264/204 X |

Primary Examiner—Lorraine T. Kendell
Attorney, Agent, or Firm—Cushman, Darby & Cushman

[57] ABSTRACT

A fibre product comprising fine-diameter inorganic oxide fibres, for example alumina fibres, which can be compressed to increase the volume fraction of fibres to at least 0.25 without excessive damage to the fibres. In a preferred embodiment the fibres are nominally-continuous and essentially-aligned and such a product is made by blow-spinning through a converging duct and collection on a wind-up drum. The product may be in the form of a mat or blanket, a tape or a woven material.

14 Claims, 2 Drawing Sheets

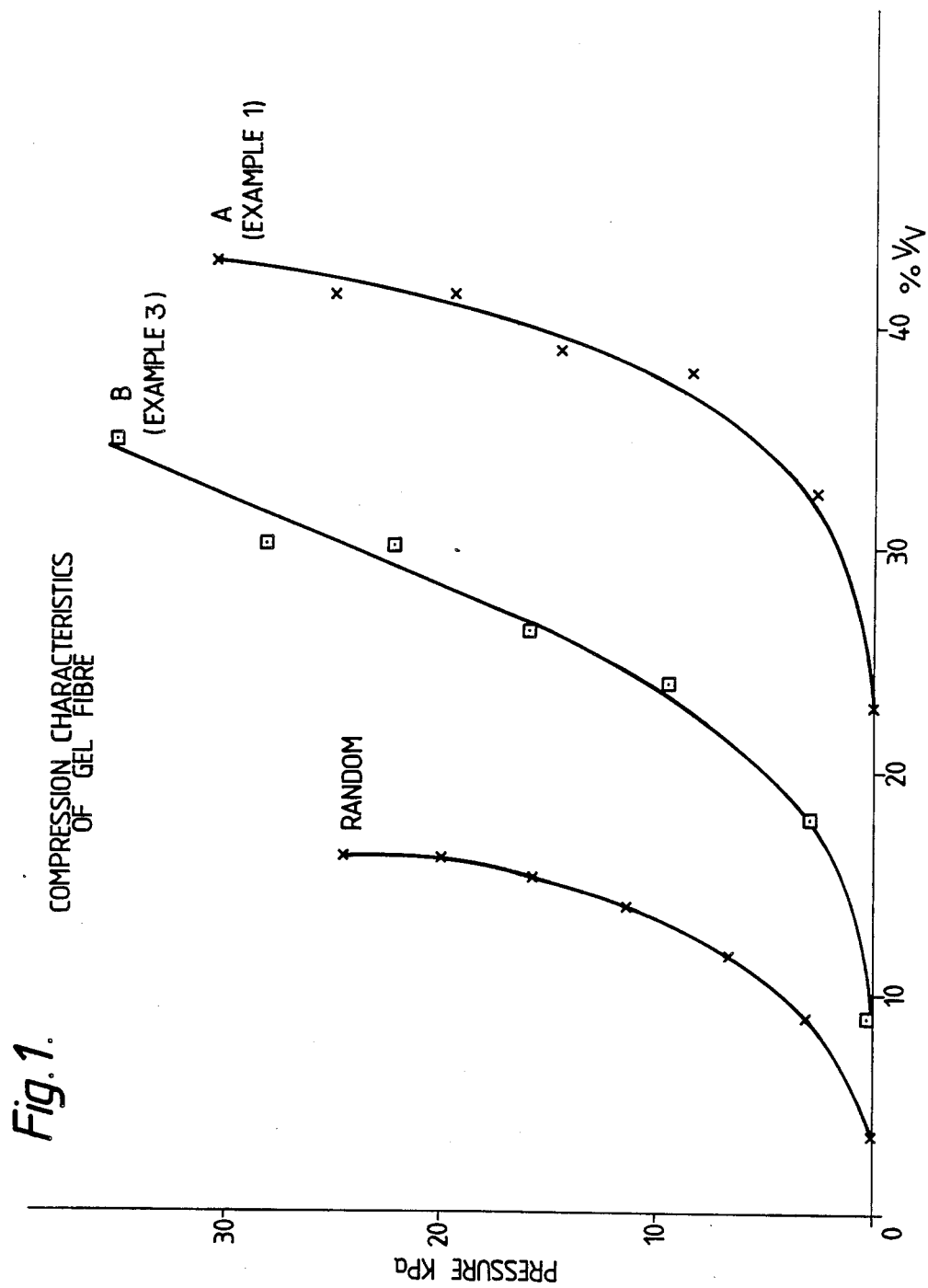

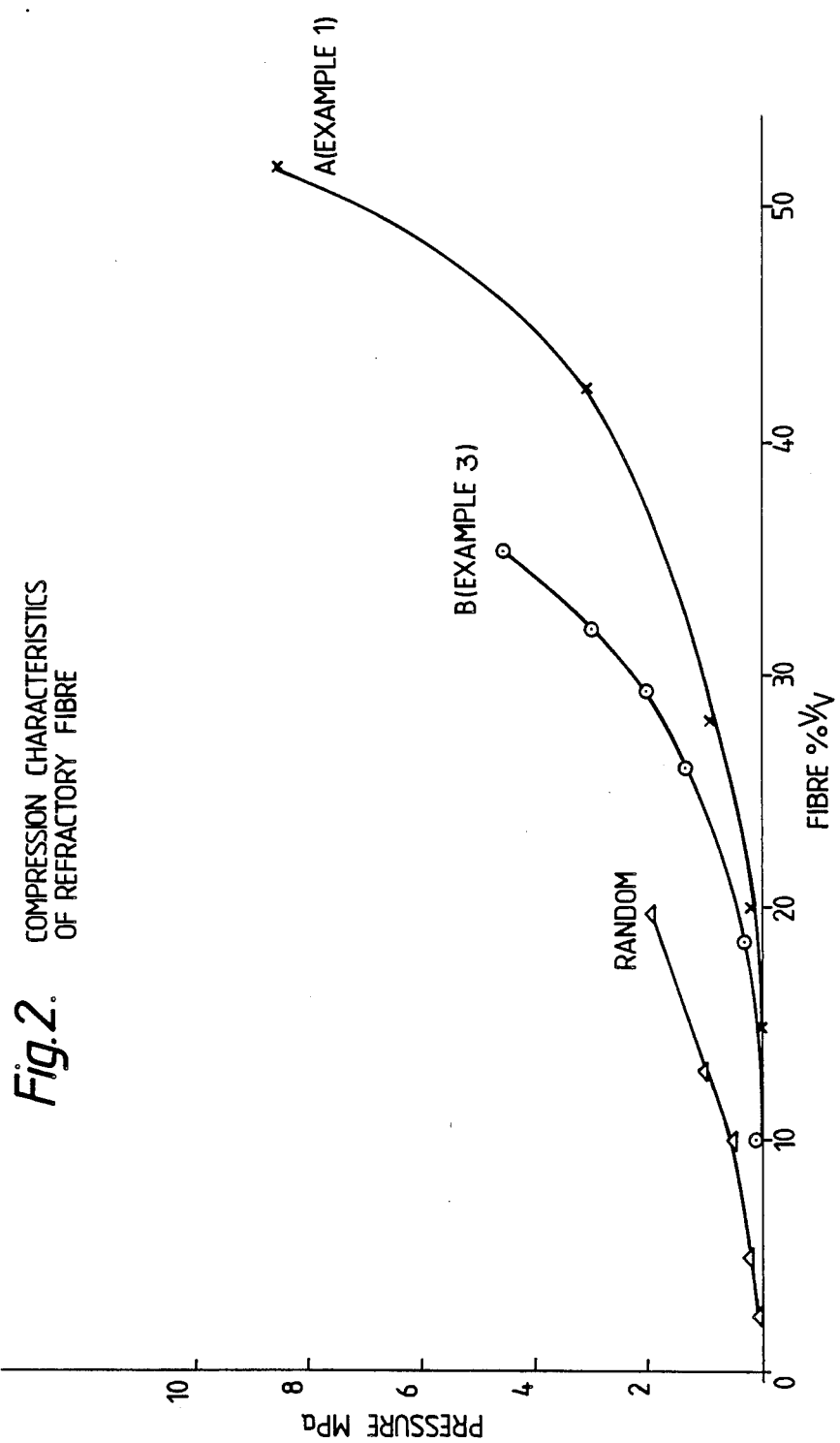

INORGANIC OXIDE FIBRES AND THEIR PRODUCTION

This invention relates to inorganic oxide fibres and their production and particularly to a new type or form of inorganic oxide fibre and a process for the production of the new fibre type or form.

It is well known to produce inorganic oxide fibres by fibrizing a spinning composition comprising a solution of a soluble metal compound which decomposes on heating to yield a metal oxide. For example alumina fibres can be made by fibrizing an aqueous solution of aluminium chlorohydrate and subsequently decomposing the aluminium compound to yield alumina fibres. The spinning composition may contain a spinning aid such as an organic polymer to confer upon it the correct rheology characteristics for spinning and additives such as phase-change inhibitors, e.g. silica, or metal oxide particles may be dissolved or suspended in the composition.

The production of fibres from the spinning composition may be effected by a variety of techniques, depending to some extent upon the form of the resulting fibres. The commonest form of inorganic oxide fibres, notably alumina fibre, is relatively short (e.g. 2 to 5 cm) staple fibre in the form of a mat or blanket obtained by partially drying the freshly-spun gel fibres in flight, collecting the partially dry fibres at the base of the spinning apparatus on a wire or belt and subsequently heating the fibres to dry them and convert the inorganic oxide precursor into the inorganic oxide. In this product form the fibres are randomly oriented in the length and breadth direction of the mat or blanket and are of relatively fine diameter, for example from 1 to 10 microns, a typical average fibre diameter being about 3 microns.

The above product can be produced by a blow-spinning technique or a centrifugal spinning technique. In the former the spinning composition is extruded through orifices into one or more fast-moving air streams which attenuate and draw-down the resulting gel fibres and carry them through a drying zone in which they are at least partially dried in flight. In the centrifugal spinning technique the spinning composition is fed into a rotating atomizer, e.g. an inverted bowl or disc, from which the composition is flung off in the form of gel fibres which are at least partially dried in flight during passage through a drying zone.

Processes of the general types described above for the production of mats or blankets of randomly oriented inorganic oxide fibres are described, for example, in our United Kingdom Patent Specification No. 1,360,197 (blow spinning) and United Kingdom Patent Publication No. 2,096,586A (centrifugal spinning).

Inorganic oxide fibres in the form of continuous filaments have also been proposed, such fibres being obtainable for example by extruding the spinning solution continuously through an orifice and winding up the continuous fibres on e.g. a drum. The gel fibres are dried between the spinning orifice and the wind up means to an extent that they do not stick together on the wind-up apparatus. Such a process is proposed, for example, in United Kingdom Patent Specification No. 1,360,197. Although it has been proposed to produce continuous inorganic oxide fibres by a centrifugal spinning technique, this is difficult to acheive in practice and continuous fibres are not generally produced by a centrifugal technique.

Continuous inorganic oxide fibres as produced hitherto are of relatively large diameter compared with the fine (e.g. 3 micron) fibres known in the randomly oriented mats or blankets described hereinbefore. Normally, continuous inorganic oxide fibres have a diameter greater than 8 and usually not less than 10 microns, it being commonly believed in the art that fibres of diameter below 8 to 10 microns are too weak in the gel state to be produced satisfactorily in continuous form. This is especially true in respect of fibres produced from spinning compositions which are solutions of oxide precursors or sols or dispersions of oxide particle of size below about 10 microns. Thus although it is proposed in United Kingdom Patent No. 1,360,297 to make fine-diameter (e.g. 3 micron) continuous fibres by blow-spinning of a spinning solution, such fibres are in practice a mere laboratory curiosity and are unknown in the market place.

Since their introduction to industry some 15 years ago, fine-diameter inorganic oxide fibres in the form of a randomly-oriented mat or blanket have attracted considerable attention and numerous attempts have been made to produce the fibres in a highly-oriented, aligned-fibre form. However since the fibres are not succeptible to processes such as carding these attempts have failed and hitherto fine-diameter (3 micron) inorganic oxide (alumina) fibres in the form of aligned fibres have been unknown in practice.

Aligned-fibre product forms of inorganic oxide (alumina) fibres are known made from the continuous-filament fibres described hereinbefore. For example continuous fibres and aligned-fibre products made from them are described in United Kingdom Patent Nos. 1,264,973 and 1,457,801. The fibres described in United Kingdom Patent No. 1,264,973 are made from suspensions (sols) of inorganic oxide particles and are of relatively large diameter, for example greater than 10 microns. The fibres described in BP No. 1,457,801 are made from an organo-aluminium polymer and are of diameter greater than 8 microns. The references do not envisage aligned continuous fibre products made of fine-diameter fibres and indeed teach that such fibres and products are in effect unobtainable in view of the inherent weakness of fine-diameter fibres in the gel state.

In recent years considerable interest has been generated in the incorporation of inorganic oxide, e.g. alumina, fibres in metals and alloys to produce metal matrix composites of improved wear-resistance and/or high temperature performance compared with the metals or alloys alone. Notable in this respect is the development of components for the motor industry, especially pistons or parts of pistons and connecting rods. This use of the fibres has highlighted the desirability of aligned-fibre product forms of the fibres, for example to confer one-directional strength on a component i.e. much greater strength in one direction than in the transverse direction.

Also, incorporation of the fibres in metal matrix composites involves packing the fibres together to obtain high volume fractions of the fibres in the composites. Inorganic oxide fibres are hard and quite brittle and compression of a randomly-oriented mat or blanket of the fibres results in extensive breakage of the fibres. Orientation or alignment of the fibres results in less breakage of the fibres when compression is applied to obtain high volume fractions of fibres.

SUMMARY OF THE INVENTION

There is a need for a product form of fine-diameter inorganic oxide fibres which is compressible without breaking the fibres and it is with such a product form that the present invention is concerned.

According to the invention there is provided a fibre product comprising inorganic oxide fibres of mean diameter less than 10 microns which can be compressed to increase the volume fraction of fibres therein to greater than 0.25 (25%) without undue breakage of the fibres and in particular with only a very low degree of fibre breakage compared with the breakage resulting from compression to the same volume fraction of fibres of a product made of randomly oriented fibres of the same diameter. In a preferred embodiment of the invention the product is compressible to increase the volume fraction of fibres therein to about 0.5 (50%) or greater without significant breakage (i.e. reduction in length) of the fibres. The pressure applied to compress the fibres may be more than 5 MPa without causing extensive breakage of the fibres.

Breakage of fibres during compression of the product results in a decrease in the tensile strength of the product in the general direction of alignment of the fibres. Excessive breakage of fibres is denoted by an abrupt fall, i.e. a fall to below 50%, in the specific tensile strength (=breaking force/mass of sample) of the product. By compression "without significant breakage" of the fibres we mean compression without causing a fall to below 50% in the specific tensile strength of the product.

The degree of compression at which significant breakage of the fibres occurs, as represented by an abrupt fall in specific tensile strength of the product, is roughly determined by compressing strips of the product (each strip of the same length and approximately the same breadth and weight) to different volume fractions of fibres, determining the specific tensile strength of each compressed strip and noting the degrees of compression between which an abrupt fall is observed in the specific strength of the compressed samples. By way of illustration strips of an essentially aligned-fibre product according to the invention wherein the volume fraction of fibres was 0.1 (10%) and of size 50 mm×3 mm (with the length direction in the general direction of alignment of the fibres) were compressed to thicknesses corresponding to volume fractions of fibres of 0.2 (20), 0.3 (30), 0.35 (35), 0.4 (40) and 0.45 (45%) in a 50 mm×3 mm channel with matching plunger. The tensile strength of each compressed strip was determined and the specific tensile strength of the compressed strip was calculated. In this experiment the specific tensile strength of the strips was found to be ±20% the same for the strips compressed to volume fractions of 0.2 (20), 0.3 (30) and 0.35 (35%) whilst the specific tensile strength of the strip compressed to 0.4 (40%) volume fraction had fallen to only about 5% of the strength of the first three compressed strips. The degree of compression at which the fibres suffered significant breakage accordingly was compression to between 0.35 (35) and 0.4 (40%) volume fraction of fibres.

As a rough guide to the compressibility of the fibre product, the abrupt fall in the specific tensile strength of the product indicating excessive breakage of the fibres can be detected by pulling the product sample between the fingers; the undamaged product resists pulling apart whilst a damaged product pulls apart easily. Using this simple test an experienced operator can determine reasonably accurately the point at which excessive damage of the fibres occurs.

The fibrous product comprises inorganic oxide fibres and it is to be understood that the volume fraction of fibres at which excessive damage of the fibres occurs on compressing the product is to be determined on the product comprising inorganic oxide fibres rather than a product comprising inorganic oxide precursor fibres. Inorganic oxide fibres are usually made from precursor materials which are formed into gel fibres which are then heated to convert the precursor materials into the desired inorganic oxides and convert the gel fibres into inorganic oxide fibres. The gel fibres often contain organic materials such as polymeric spinning aids and these are removed during heating of the gel fibres to form the inorganic oxide fibres.

Although, as stated, the compressibility test must be made on the product comprising inorganic oxide fibres, a guide as to the compressibility of such a product is given by the behaviour on compression of the product comprising gel fibres. Gel fibres are less rigid than the final inorganic oxide fibres and are able to creep so that they are less liable to breakage on compression than are the final inorganic oxide fibres. Nevertheless the volume fraction of gel fibres in a product compressed to say 40 KPa is a good indicator of the resistance to compressive damage of the inorganic oxide fibres in the final product; in general the higher the volume fraction of gel fibres in the compressed product the greater will be the resistance to compressive damage of the fibres in the final product and the higher will be the volume fraction of fibres at which excessive damage is caused to the fibres in the final product. By way of example we have found that a product comprising alumina precursor gel fibres and compressible to 33% volume fraction fibres at 40 KPa yielded a final product comprising alumina fibres which was compressible to 29% volume fraction fibres without excessive breakage of the alumina fibres, whilst a gel fibre product compressed to 40% volume fraction yielded a final product which was compressible to over 45% volume fraction fibres without excessive breakage of the alumina fibres. It is to be understood, however, that the compression behaviour of a product comprising gel fibres is only a guide as to the compression behaviour of the product so that the test of the compression behaviour of the product comprising gel fibres is not a substitute for the test on the final product; in general however a final product will compress to greater than 25% volume fraction fibres without excessive damage to the fibres if the precursor product comprising gel fibres yields a volume fraction of fibres greater than 30% on compression at 40 KPa.

Preferably the product of the invention is an essentially-aligned fibre product comprising inorganic oxide fibres of average diameter not greater than 10 microns and preferably not greater than 5 microns.

By the term "essentially-aligned-fibre product" a used throughout this specification is meant a product form in which the fibres extend in the same general direction but may not be truly parallel over their entire length so that a degree of overlap of fibres is possible and any particular fibre may extend over part of or even its entire length at an angle, e.g. up to 30°, or even higher with respect to the general direction of alignment of the fibres. In such a product the overall impression is of fibres which are parallel but in fact a slight degree of overlap and intertwining of fibres is desirable in order to confer lateral stability to the product to enable it to be handled without undue separation of the fibres. We prefer that at least 90% of the fibres be essentially parallel.

In an especially preferred embodiment of the product the inorganic oxide fibres are "nominally continuous" by which term is meant that the individual fibres may not be truly continuous in the sense of having infinite length or of extending the entire length of the product but each fibre has appreciable length, e.g. at least 0.5 meter and usually several meters, such that the overall impression in the product is of continuous fibres. Thus free ends of fibres may appear in the product, representing an interruption in fibre continuity, but in general the number of free ends in any square cm of the product will be relatively low and the proportion of interrupted fibres in a square cm will be no greater than about 1 in 100.

A typical product according to the invention comprising nominally-continuous fibres is a mat or blanket of thickness a few mms. In a product of this thickness the number of free ends of fibre in a square cm of the product may be up to about 2500; this compares with about 50,000 free ends in a product of similar mass made of short (up to 5 cms) staple fibres of the same diameter. The product made of nominally continuous fibres is thus very different in appearance and properties from a product made of short, staple fibres.

The essentially-aligned and nominally-continuous structure of the preferred products of the invention is demonstrated by the high Specular Reflectance of such products. We have observed that the greater the degree of alignment of the fibres, especially nominally-continuous fibres, in the product, then the greater is the Specular Reflectance of the product. The products exhibit a Specular Reflectance in the general direction of alignment of the fibres of greater than 10 units, preferably greater than 20 units.

By "Specular Reflectance" is meant the light reflected from the surface of the product in the test described in BS 3900: Part D2: 1967.

In carrying out the test described in BS 3900: Part 2: 1967 we prefer to utilize light impinging at an angle of 60° to the normal from the surface, which 60° is the angle recommended in the BS test for general purpose measurements on paints. In general, the light reflected from the surface of the fibrous products of the invention is less than the light reflected from the surface of a paint so that gloss readings of below 50 units are typical; we therefor depart from BS 3900: Part D2: 1967 in accepting readings below 50 units.

It is to be understood that the Specular Reflectance in the general direction of alignment of the fibres is usually greater than the Specular Reflectance in a direction perpendicular to the general direction of alignment of the fibres and the values quoted herein are in respect of Specular Reflectance in the general direction of alignment of the fibres. By way of illustration typical alumina precursor fibre products according to the invention exhibited a Specular Reflectance of up to 30-40 units in the general direction of alignment of the fibres and of 2-15 units in the direction perpendicular to the general direction of alignment of the fibres. By way of comparison a mat of randomly-oriented short (below 5 cm) alumina precursor fibres of the same diameter exhibited a Specular Reflectance of only 2-6 units in all directions. The specular reflectance figures quoted above were determined on gel fibre products prior to heat-treatment of the products.

Specular Reflectance, which is a measure of the proportion of incident light reflected by the surface of the product, is a readily determinable property of the product. It has the advantage by comparison with certain other properties of the product that not only is it readily determinable but also that it is exhibited by the gel fibres (i.e. fibres which have been dried but not heated to the temperature required to convert the alumina precursor to alumina) as well as by the final heat-treated fibres. Thus it is possible to determine whether the fibres are sufficiently aligned to yield a satisfactory product without the necessity of subjecting the product to a heat treatment programme.

As is described hereinbefore, a small degree of non-alignment of the fibres in the product has the advantage of conferring lateral stability on the product to enable it to be handled satisfactorily. The preferred product comprising essentially-aligned and nominally-continuous fibres possesses a degree of lateral cohesion such that significant separation of the fibres is resisted under normal product handling conditions.

Preferably the lateral cohesion in the product, resulting from fibres disposed at an angle to the general direction of alignment of the fibres, is such that the product exhibits a tensile strength of at least 25,000 Pa in a direction perpendicular to the general direction of alignment of the fibres. The lateral strength of the product will depend to some extent upon the diameter of the fibres since given the same degree of entanglement, fatter fibres will produce a greater lateral strength than will thinner fibres; in fact fatter fibres tend to be less entangled than thinner fibres so that in practice fatter fibres result in lower lateral strengths in the product.

The fibres in the product of the invention are polycrystalline metal oxide fibres, for example alumina and zinconia fibres, and preferably are alumina fibres. In this case the alumina fibres may comprise alpha-alumina or a transition phase of alumina, notably gamma- or delta-alumina. Typically the fibres will comprise wholly a transition alumina or a minor proportion of alpha-alumina embedded in a matrix of a transition alumina such as gamma- or delta-alumina. We prefer fibres comprising zero or a low alpha-alumina content and in particular an alpha-alumina content of below 20 and especially below 10% by weight. In general the greater the alpha-alumina content of the fibres, the lower is its tensile strength and the lower is its flexibility. The preferred fibres of the invention exhibit acceptable tensile strengths and have a high flexibility. In a particular embodiment of the invention, the fibres have a tensile strength greater than 1750 MPa and a modulus greater than 200 GPa.

The density of the fibres is largely dependent upon the heat treatment to which the fibres have been subjected and the presence or absence of a phase-stabiliser in the fibres. After spinning and at least partial drying, the gel fibres are usually heated in steam at a temperature of from 200° C. to about 600° C. to decompose the metal oxide precursor and then are further heated to burn out any organic residues and to sinter the resulting metal oxide fibres. Sintering temperatures of 1000° C. or higher may be employed. After the steam treatment the fibres are highly porous and high porosity is retained during sintering up to, for example, 900°–950° C. However, after sintering silica-containing alumina fibres at for example above 1100° C., e.g. up to 1350° C. or higher, the fibres have little porosity. Thus by controlling the sintering temperature and amount of phase-stabiliser present, low density fibres of high porosity or high density fibres of low porosity may be obtained. Typical apparent densities for low density and high density alumina fibres are 1.75 g/ml and 3.3 g/ml; fibres of any desired density within this range can be obtained by careful control of the heat treatment to which the fibres are subjected. Typical apparent low and high densities of zirconia fibres are 4.0 and 5.6.

We have observed that the modulus of the fibres does not appear to be greatly affected by sintering the fibres at above 1000° C. and does not vary greatly in accordance with the apparent density of the fibres. For instance, over the range of apparent fibre densities of 2 g/ml to 3.3 g/ml, the modulus of alumina fibres has been observed to change only from about 170–230 GPa to about 240–300 Gpa. Thus the ratio of fibre modulus to fibre density (=specific modulus) is generally greatest in respect of low density fibres.

The aligned-fibre products can be produced by a blow-spinning technique or a centrifugal spinning technique, in both cases a spinning formulation being formed into a multiplicity of fibre precursor streams which are dried at least partially in flight to yield gel fibres which are then collected on a suitable device such as a wind-up drum rotating at high speed. We prefer to use a blow-spinning technique in which the spinning formulation is extruded into a multiplicity of fibre precursor streams, which are entrained in air streams and passed through a converging duct to a wind-up drum. Preferably the spinning formulation is extruded into converging streams of air of relative humidity greater than 70%. The speed of rotation of the wind-up drum will depend upon the diameter of the drum and is matched to the speed of spinning of the fibres so that undue tension is not applied to the weak gel fibres. As a guide only, a wind-up drum speed of 1500 rpm is fairly typical for a drum of diameter 15 cms. In practice it may be desirable to win the wind-up drum slightly faster than the speed of extrusion of the fibres so that the fibres are subjected to slight tension which serves to draw down the fibres to the desired diameter and to keep the fibres straight. Of course, the applied tension should not be sufficient to break the majority of the fibres.

As stated hereinbefore, the fibres may not be truly continuous and generally are of a few meters length. The minimum fibre length in the case of collection on a wind-up drum is approximately equal to the circumference of the wind-up drum since fibres which are shorter than this tend to be flung off the rotating drum. Because the fibres are not of infinite length it is important that a multiplicity of fibres be spun simultaneously so that the resulting collection of fibres pass through the apparatus in a bundle or sheet whereby free ends of fibres are carried along by the bundle or sheet of fibres which gives an overall impression of fibre-continuity.

The spinning formulation may be any of those known in the art for producing polycrystalline metal oxide fibres and preferably is a spinning solution free or essentially free from suspended solid particles of size greater than 10 and preferably greater than 5 microns. The rheology characteristics of the spinning formulation can be readily adjusted to result in long fibres rather than short fibres, for example by use of spinning aids such as organic polymers or by varying the concentration of fibre-forming components in the formulation.

The fibre product of the invention can be a sheet or mat (as described hereinbefore) comprising essentially-aligned and nominally-continuous fibres exhibiting lateral cohesion as a result of entanglement of some of the fibres. A typical product of this type is a sheet or mat of thickness a few, say 2–5 mms, width several cms and length a meter or more, obtained by collecting the fibres on a wind-up drum and cutting the collected fibres parallel to the axis of the wind-up drum (the length and width of the sheet or mat thus being determined by the dimensions of the wind-up drum). Other product forms such as yarns, rovings, tapes and ribbons can be obtained either from the product collected on a wind-up drum or directly by using a suitable fibre-collection technique. In the case of a product collected on a wind-up drum, the product can be cut in the general direction of alignment of the fibres to provide tapes or ribbons which can be drawn off from the drum and converted if desired into yarns or rovings.

The fibre product in the form of yarns, rovings, tapes or ribbons can be converted into woven products using suitable weaving techniques. Woven product forms of the fibres may be an especially useful form of the fibres for incorporation as the reinforcement for metals in metal matrix composites and products in the form of woven material are provided according to a feature of the invention.

The fibre products may be used in any of the applications in which alumina fibres are commonly employed, for example as thermal and accoustic insulating materials and as the reinforcement for metal matrix composites.

DESCRIPTION OR PREFERRED EMBODIMENTS

The invention is illustrated by the following Examples in which values quoted of density and porosity of fibres were determined as follows:

Fibre Porosity—As has been described gel fibres after decomposition develop internal pores. The total amount of porosity depends both on the raw materials used and the method of decomposition and sintering. Provided the mean pore diameter is less than 8 nm, the water sorption capacity is a convenient measure of total pore volume.

We define:

$$\text{Fibre porosity} = \frac{\text{Water sorption (g) at 86\% RH}}{\text{Weight of dry fibre}} \times \text{fibre true density}$$

To determine the water sorption capacity a sample of fibre, dried at 150° C./2 hrs to constant weight, is put into a desiccator over saturated KCl (which gives a constant vapour pressure equivalent to 86% relative humidity) for 3 days (or until a constant weight is reached). It is reweighed and the increase in weight gives the volume of pores. If the water-saturated sample is now put into a Helium pycnometer (e.g. Quantachrome stereopycnometer) its total volume may be determined. By total volume we mean the volume of alumina in the fibres plus any internal pores. The apparent density is then given by $$\frac{\text{Apparent}}{\text{Density}} = \frac{\text{Weight of dry fibre (g)}}{\text{Total volume of water saturated fibres (ml)}}$$

The fibre true density is obtained by measuring the volume of a known weight of Alumina fibres when dry with a Helium pycnometer since the gas completely penetrates the internal pores. Using a Quantachrome stereopycnometer a minimum weight of 2 g fibre should be used.

Alumina fibres of all compositions finished at 950° C. or below will possess pores within the above size limits. In some cases alumina fibres treated at temperatures up to 1100° C. can still be within the above limit.

However, depending on the precise composition and finishing temperature of some alumina fibre samples, it will not be possible to fill all internal pores with water as described above. Zirconia fibres have pores up to 30 nm in diameter and all the internal pores in zirconia fibres cannot be filled with water. In such cases the porosity obtained by the water sorption method is an underestimate of the true value and the apparent density will be an overrestimate of the true value. For samples finished above 950° therefore the pore diameter must be checked by examining the $N_2$ isotherm hysteresis loop. If a clear single maximum is observed for both adsorption and desorption branches, the total volume adsorbed is a measure of the total pore volume.

In such cases $$\frac{\text{Pore volume}}{(\text{ml/g})} = \frac{\text{Total volume } N_2 \text{ adsorbed (ml at } NTP) \times 28}{22400 \times 0.8081 \times \text{wt of dry fibre (g)}}$$

When a clear single maximum cannot be observed then the true total pore volume will exceed that calculated from the above expression when the volume $N_2$ adsorbed is put equal to the value observed where the desorption branch first deviates from the adsorption branch.

BRIEF DESCRIPTION OF THE DRAWINGS

FIG. 1 shows the observed compression characteristics of gel fibre A and a comparative gel fibre (labeled RANDOM) as prepared and treated in Example 1, as well as gel fibre B from Example 3.

FIG. 2 shows the compression characteristics of refractory fibre A (fibre A from example 1, treated as in Example 2), comparative fibre (labeled RANDOM, from Example 1, treated as in example 2), and refractory fibre B (fibre B from example 3, treated as in Example 2).

EXAMPLE 1

Preparation of a gel spinning solution 0.1 gm of thiourea was dissolved in 600 gms of commercial aluminium chlorhydrate solution (Locron L available from Hoechst AG). The solution was stirred with a propeller stirrer and 6.5 gms of polyethylene oxide (Union Carbide Polyox WSR-N-750) were added; the polymer dissolved over a period of 2 hours. At this stage the solution viscosity was approximately 1 poise. 160 gms of aluminium chlorhydrate powder (Hoechst Locron P) were then added to the solution; the powder dissolved after a further 2 hours stirring. 35 gms of a siloxane surfactant, Dow DC 193, were then added. The solution was filtered through a glass fibre filter (Whatman GF/B) rated nominally between 1 and 1.5 microns.

The solution viscosity, measured on a low shear Ubbelhode capillary viscometer was 18 poise.

Formation of Fibres

The solution was extruded through a row of holes on either side of which were slits through which air was direceed to converge on the emerging extrudate. The air flowed at 60 m/sec and was humidified to 85% relative humidity at 25° C. Further streams of heated dry air at 60° C. flowed outside the humidified air streams. Long, (nominally continuous) gel fibres were formed and these were fed with the co-flowing air streams into a converging duct at the base of which the mixture impinged at a gas velocity of 14 m/sec on a rotor coated with fine Carborundum paper and rotating at 12 m/sec peripheral velocity. A blanket of essentially aligned fibres accumulated on the rotor.

After 30 minutes, the rotor was withdrawn from the base of the converging duct, stopped and the aligned-fibre blanket was cut parallel to the axis of the rotor and removed from the rotor. At this stage the gel fibres contained 43% by weight of refractory material with silica constituting 4.1% by weight of the refractory material. The median gel fibre diameter was 5 microns.

Fibre Blanket Properties

A sample of the fibre blanket was compressed in a Shirley Thickness gauge and the observed compression characteristics are shown as curve A in FIG. 1. For purposes of comparison, the compression procedure was carried out on a blanket made of gel fibres of thickness about 10 mms and mean fibre dimeter 5 microns in which the fibres were randomly distributed. The characteristics of the comparison blanket are also shown in FIG. 1 ("RANDOM").

The mean Specular Reflection (BS 3900: Part D2: 1976) of the sample was 27.3 units along the direction of general alignment of the fibres and 8.8 units perpendicular to the general direction of alignment. For purposes of comparison, the Specular Reflectance was determined for a blanket made of short, randomly-oriented fibres as described above; values of 3.9 units and 4.1 units were noted in respectively the length and breadth directions of the blanket.

The "as spun", gel fibre blanket was dried for 30 minutes in an oven at 150° C. and then was immediately transferred to a second oven purged with steam at 300° C. and 1 atmosphere pressure. The purge steam temperature wwas raised to 600° C. over a period of 45 minutes, whereupon the oven was purged with air and the temperature was then increased gradually to 900° C. over a period of 45 minutes. At this stage, the fibres were white and porous. The main crystalline phase was eta-alumina, the porosity 40% by volume and the surface area 140m²/g. The median diameter of the fibres was 3.6 microns. A sample of the fibres (25 fibres) was tested with a Marsh micro-tensile testing machine in which strength and modulus of individual fibres (of length 1 mm) were measured. Graphs were plotted from the results and correlations of fibre strength and modulus as a function of fibre diameter were determined. Table 1 shows the correlated values of tensile strength and tensile modulus as a function of fibre diameter.

TABLE 1

| Diameter (microns) | Tensile Modulus (GPa) | Tensile Strength (MPa) |
| --- | --- | --- |
| 2.75 | 272 | 2450 |
| 2.95 | 268 | 2355 |

TABLE 1-continued

| Diameter (microns) | Tensile Modulus (GPa) | Tensile Strength (MPa) |
|---|---|---|
| 3.1 | 262 | 2350 |
| 4.35 | 237 | 2150 |
| 6.0 | 215 | 2020 |

EXAMPLE 2

The final product from Example 1 was heated in air for 15 minutes at 1300° C. A refractory fibre of median diameter 3 microns was obtained. The principle alumina phase in the fibre was delta-alumina in the form of small crystallites together with 3% by weight of alpha-alumina. The fibre porosity was 10%.

Samples of a fibre tow pulled from the blanket were compressed in a modified Instron tensile testing machine. The compression characteristics are shown as curve A in FIG. 2. For purposes of comparison, a blanket made of randomly-oriented short fibres as described in Example 1 was fired and compressed in the same manner; the comparison characteristics are also shown in FIG. 2 ("RANDOM"). The sample of fibre tow which had been compressed as above was tested under tension. The sample compressed to 42.5% by volume of fibre remained strong, that compressed to 52% by volume of fibre was weak; implying a limiting packing volume for the fibres in the tow of between these limits. For purposes of comparison, a similar test on the compressed blanket made from randomly-oriented, short-fibres indicated extensive damage to the fibres upon compression to about 12.5% by volume of the fibres.

A sample of fibre blanket 2 cms long by 1 cm deep width was held between the jaws of an Instron machine with the jaws 2 mm apart and pulled normal to the general direction of fibre alignment. The tensile strength in this direction was 42500 N/m$^2$.

Measurements of tensile modulus and tensile strength were made on 50 fibres and correlated value of modulus and strength as a function of diameter were determined; these are shown in Table 2.

TABLE 2

| Fibre Diameter (microns) | Tensile Modulus (GPa) | Tensile Strength (MPa) |
|---|---|---|
| 2.75 | 293 | 2520 |
| 2.95 | 277 | 2330 |
| 3.1 | 275 | 2310 |
| 4.35 | 259 | 2175 |
| 6 | 250 | 2080 |

EXAMPLE 3

A spinning solution was prepared and fibres were spun according to the method described in Example 1. The fibres were collected on a rotor rotating at 9 m/sec peripheral speed, and an essentially-aligned fibre blanket was obtained. The median gel fibre diameter was 5 microns and 87% of the fibres were essentially parallel (within ±10°).

The gel fibre blanket was compressed in a Shirley Thickness gauge and compression characteristics are shown as curve B in FIG. 1.

The mean Specular Reflection of the sample was 20.5 units along the general direction of alignment of the fibres and 10:9 units normal to that direction.

The fibre was fired according to the procedure described in Example 2 (1300° C.), and compression characteristics of fibre tows were again determined; these are shown as curve B in FIG. 2.

The compressed fibre tows were tested in tension as in Example 2 and an abrupt fall in strength was observed with the sample compressed to 29.4% by volume of fibres. The 26% by volume sample was undamaged.

EXAMPLE 4

A spinning solution was prepared from the following ingredients:

| | |
|---|---|
| Aluminium chlorhydrate solution (Hoechst Locron L) | 600 gm |
| Aluminium chlorhydrate flake (Hoechst Locron S) | 150 gm |
| Polyethylene oxide (Polyox WSR-N-750) | 5.75 gm |
| Siloxane (Dow DC-193) | 41.8 gm |
| Thiourea | 0.1 gm |

The thiourea was dissolved in the aluminium chlorhydrate solution and the Polyox was added and dissolved over 3 hours, stirring with a propeller stirrer. Flake was added over 15 minutes and stirring continued for a further 3 hours. The solution was strained through Gelman polypropylene filter pads (Gelman Sciences Part No. 61790), then filtered through a Whatman GF/Biglass fibre filter. The solution viscosity, measured with an Ubbelhode viscometer at 25° C. was 16 poise.

The solution was extruded through a row of holes at a rate of 3.2 ml/hole per hr. Jets of humid air at 25° C. and 88% relative humidity impinged on the extrudate which was attenuated into fibres. Dry air at 68° to 70° C. flowed outside the humid air streams and the mixture of air and fibres flowed into a converging duct, whence they were discharged on to a wind-up drum coated with fine emery paper rotating at 10 m/sec. Air left the duct at 16 m/sec. Long, essentially continuous fibre precursors (gel fibres), of mean diameter 13 microns, containing 4.5% silica on refractories were produced.

10 g of gel fibre were heated in steam (100 min. 340° C. rising to 520° C.) and then in air (1 hr; 800°–900° C. temperature).

The apparent density of the fibres was determined to be 1.93 g/ml and 20 fibres were tested using a Marsh microtensile machine. Their mean diameter was 9.50±1.50 micron, Youngs Modulus was found to be 53±27 GPa, and their tensile strength 452±203 MPa. After compression of the product at 500 kPa using a Shirley thickness gauge the volume fraction of fibres was 42% and on release of pressure the sample was undamaged. 1 g of the 900° C.-fired fibre was heated to 1300° C. for 30 minutes when its apparent density was 3.4 g/ml. 20 fibres were tested and found to be 9.14±0.90 micron diameter, with Youngs Modulus 120±21 GPa and Tensile Strength 449±149 MPa. A sample was compressed to a volume fraction of 30.6% at 500 kPa and was found to be undamaged on release of the pressure.

EXAMPLE 5

A gel fibre was prepared as in Example 4.

5.3 g of gel fibres were heated in a tube furnace to 150° C. during 40 mins in an air stream after which the air stream was replaced by steam. Over 2.5 hours the temperature was raised to 600° C. and then maintained at 600° C. for 1.5 hours. The steam was replaced by air and the temperature raised to 940° C. over 1 hour 40 mins. The fibres had an apparent density of 1.76 g/ml and 20 fibres were tested to determine Young's Modulus (45.3±4.3 GPa), tensile strength (377±100 MPa) and diameter (7.48±0.64 um). On compression to 100 kPa the fibre volume fraction was 32.3% and on release of pressure the fibres were undamaged.

EXAMPLE 6

0.1 gm of thiourea was dissolved in 600 gm of commercial aluminium chlorhydrate solution (Locron L. available from Hoechst AG); 16.5 gm of polyethylene glycol (PEG 10000) were then stirred in to maintain clarity later in the batch, followed by 21.8 gm of magnesium chloride hexahydrate. After 5 minutes the solution was stirred at 1500 rpm with a Greaves type B mixer and 5.8 gm of polyethylene oxide (Polyox-WSR-205) were added. Mixing was continued wth a propeller and after a further 30 minutes 150 gm of aluminium chlorhydrate flake (Hoechst Locron P) was added gradually. The flake was dissolved after 3 hours at which stage the solution viscosity, measured with an Ubbelhode suspended level viscometer, was 32.5 poise. 5 ml of water were blended in to reduce the viscosity to 22.1 poise at which the solution is more stable.

The solution was then extruded at a rate of 1.6 ml per hour per hole and spun according to the method described in Example 1, with humid air of 88% relative humidity at 25° C., and dry air at 65° C. The fibres were collected on a drum surface rotating at 10 m/sec with the co-flowing air stream discharging from the duct at 14 m/sec.

The product was an aligned fibre blanket of gel precursor fibres containing 2% magnesia on refractories and of mean diameter 4.5 microns. The fibres could be compressed to a volume fraction of 28% by application of 40 kPa pressure.

In a further run the spinning rate was raised to 3 ml/hr per hole, other conditions being maintained. The gel fibre produced was of mean diameter 8.8 microns with a spread of diameters of from 7 to 12 microns.

6.1 g of the gel fibre (mean diameter 8.8±0.9 micron) was heated in a tube furnace to 150° C. with air flowing over the sample. At 150° C. steam was introduced in place of the air and the temperature raised from 200° to 710° C. over 2.75 hrs. The steam purge was then replaced by air and the temperature raised to 900° C. over 50 mins. The sample was then removed from the furnace. Its apparent density was 2.03 g/ml, porosity 36.4%, surface area 144 m²/g and mean fibre diameter was 5.46±0.86 um. Using a Shirley thickness gauge it was compressed to a volume fraction of 35.4% at 100 kPa and was found to be undamaged after the pressure was released.

EXAMPLE 7

A spinning solution was prepared following the general procedure of Example 6. Thiourea (0.1 gm) was blended with 600 gm of aluminium chlorhydrate solution and followed by 22.1 gm of polyethylene glycol (PEG-10,000).

The solution was then stirred with a Greaves B laboratory mixer operating at 2000 rpm and an alumina stabilised silica sol (Wesol P) was added slowly to the batch, 42 gm being added over 5 minutes.

5.8 gm of polyethylene oxide (Polyox WSR-205) were added quickly and after 7 minutes the Greaves mixer was replaced by a propeller stirrer and 170 gm of aluminium chlorhydrate flake was added over 30 minutes. The dissolution of the flake continued for 3 hours after which the solution was filtered, with difficulty, through GF/B filters under 50 psig pressure. The solution viscosity was 8.2 poise.

The solution was spun following the procedure and rates of Example 6, with the wind-up drum speed increased to 12 m/sec. The gel precursor fibres contained 4.5% silica on refractories and were 4.3 microns in diameter. The fibre blanket was compressed to 30.5% volume fraction at 40 kPa, without damage to the fibres.

The above gel fibres, of diameter 5 microns were treated as follows in a tube furnace. The temperature was raised to 150° C. in 40 mins while the furnace was purged with air. The air was then replaced by steam and the temperature raised to 500° C. in 2 hours. The steam was then replaced by air and the temperature raised to 950° in 1.5-2 hours. The properties of the product are given below:

| Mean Fibre diameter (microns) | Apparent Density (g/ml) | Porosity (%) | Surface Area (m²/g) | Compressibility* | |
|---|---|---|---|---|---|
| | | | | Pressure (kPa) | Volume Fraction (%) |
| 3.0 | 2.05 | 35.3 | 161 | 500 | 35.2 |

*The fibres were undamaged after release of pressure.

EXAMPLE 8

A solution without refractory stabiliser was prepared as follows. 0.1 gm of thiourea was dissolved in 600 gm of aluminium chlorhydrate solution (Locron L from Hoechst AG), and 16.5 gm of polyethylene glycol (PEG 10000) was added. A spinning aid, polyethylene oxide (WSR-N-750), was dissolved over 3 hours with the help of a propeller stirrer. Stirring was continued and the solution was completed by adding 160 gm of aluminium chlorhydrate flake gradually over 15 minutes and stirring for a further 2 hours. The viscosity was 14.1 poise and after filtering through a GF/B filter under 50 psig pressure, the solution was spun as in Example 6 to give an aligned fibre blanket. The fibre diameter was 5 micron and the compression characteristics of the product were similar to those of Example 6.

The above gel fibres, of diameter 5 micron, were treated as follows in a tube furnace. The temperature was raised to 150° C. in 40 mins while the furnace was purged with air. The air was then replaced by steam and the temperature raised to 500° C. in 2 hours. The steam was then replaced by air and the temperature raised to 950° C. in 1.5-2 hours. The properties, of the product are given below:

| Mean Fibre diameter (microns) | Apparent Density (g/ml) | Porosity (%) | Surface Area (m²/g) | Compressibility* | |
|---|---|---|---|---|---|
| | | | | Pressure (kPa) | Volume Fraction (%) |
| 3 | 2.08 | 29.4 | 139 | 500 | 40.9 |

*Fibres were undamaged after release of pressure.

EXAMPLE 9

A precursor solution to yttria-stabilised zirconia fibres was prepared as follows:

67.7 gm of glacial acetic acid, 16.4 gm of 36.5% w/w concentrated hydrochloric acid and 0.025 gm of thiourea were mixed together with a PVC-coated propeller stirrer.

Basic zirconium carbonate paste containing 38% w/w zirconia was procured from magnesium Electron Ltd. 287.5 gm of the paste were used in the preparation of the solution. The first 200 gm was added to the stirred mixed acids in 25 gm aliquots over a period of 45 minutes, the separate additions being made every 5 minutes. 25 gm of yttrium chloride hexahydrate were added over 5 minutes and stirred in for a further 40 minutes. The remaining zirconium carbonate paste was then added in quantities of 12.5 gm every five minutes. The solution viscosity was 8 poise at this stage.

The solution was pressurised with air at 50 psi and filtered through a Whatman GF/B glass fibre filter, care being take to recover all the liquid.

3.9 gm of polyethylene oxide (Union Carbide WSR-N-750) were then dissolved in the solution by stirring with the same propeller for 2 hours. The viscosity, 4 to 12.5 micron were produced. The spinning was stopped after 10 minutes and an aligned tow of fully stabilised zirconia precursor fibres was removed from the drum.

5 g of the gel fibre was put into a tube furnace and heated to 200° C. in 1 hour while purging with 4 liters/min air. After 30 mins at 200° C. the air purge was reduced to 3 liters/min and 2 liters/min superheated steam was introduced (calculated at room temperature and pressure). The temperature was then raised to 500° C. in 100 mins and held at 500° C. for 20 mins after the steam supply was shut off and the air flow raised to 4 liters/min. The temperature was then raised to 900° C. during 80 mins and held at that temperature for 20 mins before cooling.

The fibres were found to have the following properties:

| Composition (% $Y_2O_3$) | Mean Diameter (micron) | Porosity (%) | Surface area ($m^2/g$) | Apparent Density (g/ml) | Compression* Pressure (kPa) | Volume Fraction (%) |
|---|---|---|---|---|---|---|
| 7.6 | 4.5 | 18.3 | 10.6 | 4.5 | 250 | 40.6 |

*Fibres were undamaged on release of pressure.

measured with an Ubbelhode suspended level viscometer, was 68.4 poise at 25° C., and was reduced to 25.8 poise by blending in 13 ml of water.

A clear spinning solution was obtained by filtering through a Whatman GF/B filter.

The solution was extruded at a rate of 1.5 ml/hr per hole through a row of holes on either side of which were slits directed to converge on the emerging extrudate. Streams of humidified air passed through the slits at a flow rate of 60 m/sec and relative humidity 84% at 27° C. Dry air, heated to 63° C., flowed outside the humid air streams.

Long, nominally continuous gel fibres were formed, and these were fed with the air streams into a converging duct. Air left the base of the duct at 14 m/sec and air and fibres impinged on a wind-up drum coated with fine Carborundun paper rotating at 10 m/sec peripheral velocity. A blanket of essentially aligned fibres accumulated on the drum.

After 15 minutes the drum was withdrawn from the base of the duct, stopped and the aligned blanket removed. At this stage the gel fibres contained 54% by weight of refractory material with yttria 7.6% by weight of the refractories. The median diameter was 4.6 micron.

A circular disc of area 10 $cm^2$ was cut from the gel fibre blanket and loaded up to 40,000 Pa on a Shirley Thickness Gauge. The gel fibre compressed to 27% v/v without damage when subjected to this load.

10.5 g of gel fibres were placed in a tube furnace and were heated in an air stream at 5° C./minute to 900° C. over 2.75 hours.

The fibres had a median diameter of 3.1 micron, an apparent density of 4.0 g/ml, a porosity of 28%, a surface area of 18 $m^2/g$ and were found to be tetragonal $ZrO_2$ by X-Ray diffraction. After compression at 100 kPa their volume fraction was 42% and on release of the pressure the fibres were found to be undamaged.

EXAMPLE 10

The spinning experiment of Example 9 was continued at an extrusion rate of 3 ml/hr per hole, other spinning parameters remaining constant. Fibres of 7.7 micron mean diameter with individual diameters ranging from

EXAMPLE 11

Zirconium carbonate paste was digested in mixed acetic and hydrochloric acids as described in Example 9; identical quantities of acids, thiourea and paste were used, but only half the quantity of yttrium chloride hexahydrate (12.5 gm) was added.

The commercial paste contained 0.5% sulphate on zirconia and this was removed from the solution when digestion of the paste was completed, at which stage the solution viscosity was 6 poise. 1.53 gm of barium chloride dihydrate were dissolved in 10 ml of water and stirred with the solution for 1 hour. 336.5 gm were recovered after filtering through GF/B filters at 50 psig pressure. 3.4 gm of polyethylene oxide (Polyox WSR-N-750) were then added and dissolved by stirring with the propeller stirrer for 2 hours.

The solution was left overnight and a precipitate reformed, whereupon it was refiltered through GF/B filters to produce a stable clear spinning solution of viscosity 21 poise (measured at 25° C.).

As in Example 9, the solution was extruded through a row of fine holes on either side of which impinged converging air slits carrying streams of humidified air flowing at 60 m/sec. The air temperature was 26° C. and relative humidity 93%. Streams of dry air at 63° C., flowed outside the humid air streams. The extrusion rate was 1.1 ml per hour per hole. The mixed air streams were directed into a converging duct from which they emerged to impinge on a drum rotating at 10 m/sec peripheral velocity.

Fine, essentially-continuous fibres were formed in the duct and accumulated as an aligned blanket on the drum. After 10 minutes the drum was withdrawn from the duct and stopped, and the thin blanket of aligned fibres was cut parallel to the rotor axis and removed.

The precursor to partially stabilized zirconia fibres comprised 55% refractory material, was sulphate-free, and contained 3.6% yttria on refractories. The fibres were 4.6 micron mean diameter with a range from 2.5 to 9 micron. They were compressed to a volume fraction of 32% when subjected to 40 kPa pressure in a Shirley thickness gauge.

5 gm of the gel fibre was put into a tube furnace and heated to 200° C. in 1 hour while purging with 4 liters/min air. After 30 min at 200° C. the air purge was reduced to 3 liters/min and 2 liters/min superheated steam was introduced (calculated at room temperature and pressure). The temperature was then raised to 500° C. in 100 min and held at 500° C. for 20 mins after which the steam supply was shut off and the air flow raised to 4 liters/min. The temperature then was raised to 900° C. during 80 mins and held at that temperature for 20 mins before cooling.

The fibres were found to have the following properties:

| Composition (% $Y_2O_3$) | Mean Diameter (micron) | Porosity (%) | Surface area ($m^2/g$) | Apparent Density (g/ml) | Compression* Pressure (kPa) | Volume Fraction (%) |
|---|---|---|---|---|---|---|
| 3.5 | 3.1 | 19.4 | 8.5 | 4.4 | 500 | 34.6 |

*Fibres were undamaged on release of pressure.

EXAMPLES 12 AND 13

A spinning solution was prepared from the following components:

| | |
|---|---|
| Aluminium chlorhydrate solution (Hoechst Locron L) | 600 gm |
| Aluminium chlorhydrate solid (Hoechst Locron S) | 115 gm |
| Polyethylene oxide (Polyox WSR-N-750) | 5.8 gm |
| Siloxane (Dow DC-193) | 94.0 gm |
| Thiourea | 0.1 gm |

The blending procedures followed those of Example 4, ending with a solution viscosity of 12.8 poise.

Example 12—The solution was spun at an extrusion rate of 1.8 ml/hole/hr to give an aligned blanket of essentially continuous fibres of mean diameter 5 micron. The gel fibres contained 10% silica on refractories.

Example 13—A further sample of the solution was extruded at a rage of 2.9 ml/hr/hole under the same spinning conditions to produce a blanket of aligned essentially continuous fibres of diameters ranging from 12 to 16 microns.

Approximately 17 g of each of the gel fibres from Examples 12 and 13 was placed in a tube furnace and heated in an air stream to 150° C. during 50 mins. The air was then replaced by superheated steam and the temperature raised to 500° C. over 2 hours. The steam was shut off and the air flow restored, the temperature then being increased to 950° C. over 100 mins before cooling.

The properties of the fibres are given in the Table.

| Example No | Mean Fibre diameter (micron) | Porosity (%) | Surface Area ($m^2/g$) | Apparent Density (g/ml) | Compression* Pressure (kPa) | Volume (%) |
|---|---|---|---|---|---|---|
| 12 | 3 | 45.9 | 181 | 1.76 | 1000 | 33.6 |
| 13 | 7 | 46.0 | 166.4 | 1.81 | 250 | 33.0 |

*No fibre damage observed after pressure released.

EXAMPLE 14

1.25 l sodium aluminate (containing 20% w/w $Al_2O_3$) stock solution was diluted to 2 l with distilled water. Separately a solution of 20% nitric acid was prepared by adding 1.429 l distilled water to 0.571 l of concentrated nitric acid (70%).

Aluminium hydroxide gel was continuously precipitated by pumping both solutions (peristaltic pumps; 30 ml/min) into a small (250 ml) well-stirred water-cooled vessel fitted with an overflow and a glass pH electrode set. The output of the pH meter was used to control the peristaltic pump feeding the nitric acid. The precipitation temperature was maintained below 25° C. by cooling and the pH set-point was 7.0 though the actual value oscillated between 6.3 and 7.8. The precipitation was terminated when pH control was lost. The gel slurry overflowed into a Buchner filter and collected over 1 hr as a thick cake. The cake was washed with 6 l of demineralised water to remove sodium ions. After washing the gel was rapidly analysed and found to contain 5.6% w/w $NO_3$, 0.08% Na+ and 17.2% $Al_2O_3$. Within 1 hour of washing, the gel (874.7 g) was slurried with 53.8 ml 70% nitric acid and heated under reflux for 1 hour. A cloudy solution was formed which after cooling had a pH of 3.93 and a density of 1.24 g/ml. This solution had an $Al/NO_3$ mole ratio of 1.78.

The solution was concentrated by distillation till it reached a strength of 27% ($Al_2O_3$), cooled to room temperature and 3.6 g of N 750 Polyox and 0.036 g thiourea were dissolved with stirring. 29 g of DC 193 siloxane were blended into this solution (500 g) and 5 ml water added. After filtration through three Gelman polypropylene filters the viscosity was 5 poise at 25° C.

The solution was extruded through a row of fine holes at a rate of 2.2 ml/hr per hole. The spinning arrangement was as in Example 9 with humid air at 26° C. and 80% relative humidity and dry air at 68° C. The fibre blanket was collected on a drum coated with fine emery paper running at 10 m/sec, and the air left the duct at 14 m/sec.

3.3 g of the resulting gel fibre was placed in a tube furnace and heated in an air stream at 3° C./minute temperature rise rate to 200° C. At 140° C. copious nitrous fumes were evolved. After holding at 200° C. for 30 min the air purge was replaced by a steam flow and the temperature raised over 1.5 hours to 500° C. The air flow was restored and the steam was cut off and after 20 min the temperature was raised to 900° C. during 1 hr. After 20 min at 900° C. the sample was cooled.

The fibres were found to have a diameter of 4.2 micron, porosity 31%, surface area 41 $m^2/g$, and an apparent density of 1.96 g/ml. After compression at 750 kPa, the volume fraction of fibres was 33.2% and on release of pressure the fibres were undamaged.

EXAMPLES 15 TO 20

Gel fibres of 5 micron mean diameter were prepared as in Example 21. Samples of these gel fibres were fired in various ways using a tube furnace as shown in Table 3. In the case of Example 16, the liquid extrusion rate was 0.7 ml/hole/hr. In the case of Example 17 the fibres were exposed to ammonia gas at room temperature for 30 mins (weight increase 6.5%) before heat treatment.

TABLE 1

| | Heat Treatment | | | | | | | | | Compression* | |
|---|---|---|---|---|---|---|---|---|---|---|---|
| Exp No | Air Time/temp (h/°C.) | Steam Time/temp (h/°C.) | Air Time/temp (h/°C.) | Mean diameter (micron) | Mean Strength (MPa) | Mean Strength (GPa) | Porosity (%) | Surface Area (m²/g) | Apparent Density (g/ml) | Pressure (kPa) | Volume fraction (%) |
| 15 | 1/150 | 4/150–600 | 1/950 | 3.11 ± 0.74 | 1738 ± 320 | 202 ± 41 | 35.9 | 84 | 1.95 | 100 | 30.8 |
| 16 | 1.5/200 | 1.5/200–500 | 2/900 | 2.2 | | | 36 | 40 | 2.03 | 250 | 43.3 |
| 17 | 0.7/150 | 2/150–500 | 1.5/950 | 3 | | | 46.4 | 141 | 1.74 | 100 | 37.4 |
| 18 | | 1.7/520 | 1/900 + 0.5/1100 | 3 | | | 35.0 | 93 | 2.20 | 500 | 31.5 |
| 19 | 1/150 | 2.6/150–500 | +0.5/950 + 0.5/1250 | 3.17 ± 1.31 | 1916 ± 496 | 234 ± 32 | 12 | 25 | 2.88 | 500 | 40.1 |
| 20 | | 1.7/520 | 1/900 + 0.5/1300 | 3.11 ± 0.43 | 822 ± 290 | 257 ± 60 | 5.4 | 12 | 3.38 | 500 | 34.9 |

*Samples were undamaged after the pressure was released.

EXAMPLE 21

A large batch of spinning solution was prepared from the following ingredients:

| | |
|---|---|
| Aluminium chlorhydrate solution (Hoechst Locron L) | 5.50 Kg |
| Aluminium chlorhydrate flake (Hoechst Locron S) | 1.85 Kg |
| Polyethylene oxide (Polyox WSR-N-3000) | 40.3 gm |
| Siloxane (Dow DC-193) | 382.3 gm |
| Thiourea | 1.6 gm |

The solution was compounded and blended according to the procedure described in Example 4. After blending, the viscosity of the solution was 22 poise, and the solution was filtered through a Balston B type filter nominally rated at 2.5 microns.

The solution was extruded through a row of fine holes on to which converged slits feeding jets of humidified air at 23° C. and 82% relative humidity, flowing at 55 m/sec. Warm dry air at 45° C. flowed ouside the humidified air and the air streams were fed into a converging rectangular duct. The extrusion rate was 0.8 ml/hole/hour. Fine, straight, essentially-continuous fibres were produced.

Air left the duct at 17 m/sec and the fibres were directed on to a finely perforated stainless steel drum, rotating at 12.5 m/sec with a suction of 2 kPa applied to the interior. The drum was stopped after 45 minutes and the suction withdrawn. A blanket of aligned precursor fibres had accumulated on the drum and was found to be 5.6 micron median diameter with a spread from 3 to 9 micron. A sample of the blanket was compressed to 42% volume fraction of fibres on application of a pressure of 40 kPa.

A sample of the precursor fibres was heated following the regime described in Example 4. The product, on cooling, could be compressed to over 50% volume fraction without breakage of the fibres. Compression characteristics are shown in the table.

| Pressure (MPa) | Volume % Fibres |
|---|---|
| 0.012 | 15 |
| 0.05 | 22.9 |
| 0.062 | 26.3 |
| 0.186 | 29.9 |
| 0.464 | 36.6 |
| 0.62 | 38.8 |
| 0.93 | 42.0 |
| 2.0 | 51 |

The blanket recovered to 28.4% on releasing the pressure; essentially no breakage of fibres occurred at 51% volume fraction fibres.

EXAMPLE 22

An essentially-aligned fibre blanket was produced with the solution and equipment outlined in Example 21, and fibre accumulated on the perforated drum until the area density had reached 0.5 kg/m². The drum was stopped with suction still applied. The drum was then restarted at a low speed of 2 m/sec and the fibre blanket traversed with a carbon reinforced nylon wheel cutter which cut the blanket into a spiral of 0.5 cm pitch, this being less than 1% of the drum circumference.

When cutting was completed the drum and suction were stopped and the spiral end taken up in a 5 cm diameter air mover. The drum was restarted at low speed and the spiral tow of fibres discharged, through the air mover, into a collecting bin.

The tow was then wound into a circular skein about 30 cm in diameter and the skein tied lightly with loops of refractory tow, already made, at 4 points separated by 90 degrees.

The skein was fired following the procedure described in Example 4 and the cooled tow of aligned porous fibre was wound on to a bobbin.

The tow was fed through a braiding machine and overwound with eight strands of 167 DECITEX viscose threads. Tows could be braided together and 1.5 Km of refractory yarn were accumulated in this way. The yarn was woven into a tape of width approx 7.5 cm and length 10 m. on an industrial tape weaving machine, and subsequently fired to 1300° C. to burn off the viscose and sinter the alumina.

What is claimed is:

1. A fibre product comprising a plurality of essentially aligned inorganic oxide fibres of mean diameter less than 5 microns, a proportion of which fibres do not extend the entire length of said fibre product wherein a degree of non-alignment of some of the fibres provides for limited fibre interwining conferring lateral cohesion upon the product and wherein said fibre product can be compressed to increase the volume fraction of fibres therein to greater than 0.25 without undue breakage of the fibres as denoted by a fall to below 50% in the specific tensile strength of the product.

2. A fibre product as claimed in claim 1 which can be compressed to increase the volume fraction of fibres therein to 0.5 or greater without undue breakage of the fibres.

3. A fiber product as claimed in claim 1, wherein at least 90% of the fibres are essentially parallel.

4. A fibre product as claimed in claim 1 wherein the proportion of interrupted fibres in a square cm of the product is no greater than 1 in 100.

5. A fibre product as claimed in claim 1 having a tensile strength of at least 25,000 Pa in a direction perpendicular to the general direction of alignment of the fibres.

6. A fibre product as claimed in claim 1, in the form of a mat or blanket.

7. A fibre product as claimed in claim 1 in the form of a tape.

8. A fibre product as claimed in claim 1 in the form of a woven material.

9. A fibre product as claimed in claim 1 comprising essentially-aligned fibres and having a Specular Rellectance of at least 10 units in the general direction of alignment of the fibres.

10. A fibre product as claimed in claim 1 wherein the Specular Reflectance is at least 20 units.

11. A fibre product as claimed in claim 1 comprising alumina fibres.

12. A fibre product as claimed in claim 1 wherein the fibres comprise a transition phase of the inorganic oxide and contain a phase stabiliser.

13. A fibre product as claimed in claim 12 wherein the inorganic oxide is alumina and the phase stabiliser is silica.

14. A fibre product as claimed in claim 11 wherein the apparent density of the fibres is from 1.75 to 3.3 g/ml.

* * * * *